(12) United States Patent
Hendrickson et al.

(10) Patent No.: US 10,171,014 B1
(45) Date of Patent: Jan. 1, 2019

(54) SYSTEM AND METHOD FOR ELECTRIC MOTOR FIELD WEAKENING WITH VARIABLE MAGNET SKEW

(71) Applicant: GM GLOBAL TECHNOLOGY OPERATIONS LLC, Detroit, MI (US)

(72) Inventors: James D. Hendrickson, Oxford, MI (US); Khwaja M. Rahman, Troy, MI (US); William F. Miller, III, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/805,248

(22) Filed: Nov. 7, 2017

(51) Int. Cl.
  *H02P 6/15* (2016.01)
  *B60L 11/00* (2006.01)
  *H02K 16/02* (2006.01)

(52) U.S. Cl.
  CPC ............. *H02P 6/153* (2016.02); *B60L 11/00* (2013.01); *H02K 16/02* (2013.01); *H02K 2201/06* (2013.01)

(58) Field of Classification Search
  CPC .. H02K 16/02; H02K 1/2706; H02K 15/0012; H02K 1/22; H02K 1/148; H02P 6/153
  See application file for complete search history.

(56) References Cited

U.S. PATENT DOCUMENTS

| | | | | |
|---|---|---|---|---|
| 6,707,209 B2* | 3/2004 | Crapo | ............... | H02K 1/278 310/154.01 |
| 6,853,105 B2* | 2/2005 | Nakano | ............... | H02K 29/03 310/156.47 |
| 7,898,123 B2* | 3/2011 | Usui | ............... | H02K 37/14 310/106 |
| 7,906,880 B2* | 3/2011 | Okubo | ............... | H02K 1/278 310/156.25 |
| 8,288,909 B2* | 10/2012 | Clark | ............... | H02K 1/278 310/156.45 |

* cited by examiner

*Primary Examiner* — Bentsu Ro
*Assistant Examiner* — Thai Dinh
(74) *Attorney, Agent, or Firm* — Lorenz & Kopf, LLP (57) ABSTRACT

An electric machine assembly includes a rotor assembly that includes a plurality of rotor parts including a reference rotor part and a first control rotor part. Each rotor part is rotatable about a longitudinal axis and mechanically separated from another rotor part along the longitudinal axis. The first control rotor part is controllable to rotate while aligned with the reference rotor part with a zero or near zero skew angle relative to the reference rotor part. The first control rotor part is also controllable to rotate while unaligned with the reference rotor part with a non-zero skew angle relative to the reference rotor part. The electric machine assembly further includes a rotor controller that is configured to control the degree of skew angle between the control rotor part and the reference rotor part.

20 Claims, 7 Drawing Sheets

SYSTEM AND METHOD FOR ELECTRIC MOTOR FIELD WEAKENING WITH VARIABLE MAGNET SKEW

TECHNICAL FIELD

The technical field generally relates to electric motors, and more particularly relates to field weakening in electric motors.

INTRODUCTION

The propulsion system in an electric vehicle includes a permanent magnet electric motor that includes a rotor portion containing a permanent magnet and a stator. When the electric motor is operated at a high motor speed, field weakening is performed by a power electronics control system to manage magnet back electromotive force (emf). This approach, however, results in reduced system efficiency. It is desirable to increase electric machine efficiency at high speed for highway driving and also to support higher gear ratios to reduce motor size.

Accordingly, it is desirable to perform field weakening without significantly reduced system efficiency. Furthermore, other desirable features and characteristics of the present invention will become apparent from the subsequent detailed description and the appended claims, taken in conjunction with the accompanying drawings and the foregoing technical field and background.

SUMMARY

An electric machine assembly is disclosed. In one embodiment, the electric machine assembly includes a rotor assembly positioned inside of a stator core and rotatable relative to the stator core wherein the rotor assembly extends along a longitudinal axis and includes a plurality of rotor parts including a reference rotor part and a first control rotor part. Each rotor part is rotatable about the longitudinal axis and mechanically separated from another rotor part along the longitudinal axis. The first control rotor part is controllable to rotate while aligned with the reference rotor part with a zero or near zero skew angle relative to the reference rotor part. The first control rotor part is also controllable to rotate while unaligned with the reference rotor part with a non-zero skew angle relative to the reference rotor part. The electric machine assembly further includes a rotor controller that is configured to control the first control rotor part to rotate while aligned with the reference rotor part with a zero or near zero skew angle relative to the reference rotor part and that is configured to control the first control rotor part to rotate while unaligned with the reference rotor part with a non-zero skew angle relative to the reference rotor part. The controller includes a processor that is configured by programming instructions encoded on non-transitory computer readable media to control the degree of skew angle between the control rotor part and the reference rotor part.

In one embodiment, the rotor assembly further includes a second control rotor part.

In one embodiment, the second control rotor part is controllable to rotate while aligned with the reference rotor part with a zero or near zero skew angle relative to the reference rotor part and controllable to rotate while unaligned with the reference rotor part with a non-zero skew angle relative to the reference rotor part.

In one embodiment, the rotor controller is configured to control the first control rotor part to rotate while unaligned with the reference rotor part with a first non-zero skew angle relative to the reference rotor part and configured to control the second control rotor part to rotate while unaligned with the reference rotor part with a second non-zero skew angle relative to the reference rotor part that is different from the first non-zero skew angle.

In one embodiment, the reference rotor part is positioned between the first control rotor part and the second control rotor part.

In one embodiment, the second control rotor part is positioned between the first control rotor part and the reference rotor part.

In one embodiment, the electric machine assembly further includes a variable cam timing actuator that is configured to drive the first control rotor part to rotate while unaligned with the reference rotor part with a first non-zero skew angle relative to the reference rotor part and that is configured to drive the third rotor part to rotate while unaligned with the reference rotor part with a second non-zero skew angle relative to the reference rotor part that is different from the first non-zero skew angle.

In one embodiment, the electric machine assembly further includes a load balancing gear set configured to drive the first control rotor part to rotate while unaligned with the reference rotor part with a first non-zero skew angle relative to the reference rotor part and configured to drive the third rotor part to rotate while unaligned with the reference rotor part with a second non-zero skew angle relative to the reference rotor part that is of the same magnitude but opposite in polarity as the first non-zero skew angle.

A method in an electric machine is disclosed. The electric machine includes a rotor assembly positioned inside of a stator core and rotatable relative to the stator core wherein the rotor assembly extends along a longitudinal axis and includes a plurality of rotor parts including a reference rotor part and a first control rotor part. Each rotor part is rotatable about the longitudinal axis and is mechanically separated from another rotor part along the longitudinal axis. The method includes rotating the first control rotor part and the reference rotor part, in a first mode of operation, with the first control rotor part aligned with the reference rotor part with a zero or near zero skew angle between the first control rotor part and the reference rotor part and rotating the first control rotor part and the reference rotor part, in a second mode of operation, with the first control rotor part unaligned with the reference rotor part with a non-zero skew angle between the first control rotor part and the reference rotor part.

In one embodiment, the first mode of operation occurs when the electric machine is operated at high torque and low speed.

In one embodiment, the second mode of operation occurs when the electric machine is operated at low torque and high speed.

In one embodiment, the rotor assembly further includes a second control rotor part.

In one embodiment, the method further includes rotating the second control rotor part, in the first mode of operation, with the second control rotor part aligned with the reference rotor part with a zero or near zero skew angle between the first control rotor part and the reference rotor part and rotating the second control rotor part, in the second mode of operation, with the second control rotor part unaligned with the reference rotor part with a non-zero skew angle between the second control rotor part and the reference rotor part.

In one embodiment, rotating the second control rotor part includes rotating the second control rotor part, in the second mode of operation, with the second control rotor part unaligned with the reference rotor part with a non-zero skew angle between the second control rotor part and the reference rotor part that is different from the skew angle between the first control rotor part and the reference rotor part.

In one embodiment, the non-zero skew angle between the second control rotor part and the reference rotor part is of the same magnitude but opposite in polarity to the skew angle between the first control rotor part and the reference rotor part.

In one embodiment, the second control rotor part is positioned between the first control rotor part and the reference rotor part.

In another embodiment, a vehicle is disclosed. The vehicle includes an electric permanent magnet motor and a controller. The permanent magnet motor includes a rotor assembly that is positioned inside of a stator core and that is rotatable relative to the stator core. The rotor assembly extends along a longitudinal axis and includes a plurality of rotor parts including a reference rotor part and a first control rotor part. Each rotor part is rotatable about the longitudinal axis and is mechanically separated from another rotor part along the longitudinal axis. The controller includes one or more processors and non-transient computer readable media encoded with programming instructions. The controller is configured to control the first control rotor part to rotate while aligned with the reference rotor part with a zero or near zero skew angle relative to the reference rotor part and control the first control rotor part to rotate while unaligned with the reference rotor part with a non-zero skew angle relative to the reference rotor part.

In one embodiment, the rotor assembly further includes a second control rotor part.

In one embodiment, the vehicle further includes a variable cam timing actuator that is configured to drive the first control rotor part to rotate while unaligned with the reference rotor part with a first non-zero skew angle relative to the reference rotor part and is configured to drive the third rotor part to rotate while unaligned with the reference rotor part with a second non-zero skew angle relative to the reference rotor part that is different from the first non-zero skew angle.

In one embodiment, the vehicle further includes a load balancing gear set that is configured to drive the first control rotor part to rotate while unaligned with the reference rotor part with a first non-zero skew angle relative to the reference rotor part and is configured to drive the third rotor part to rotate while unaligned with the reference rotor part with a second non-zero skew angle relative to the reference rotor part that is of the same magnitude but opposite in polarity as the first non-zero skew angle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The subject matter described herein discloses apparatus, systems, techniques and articles for mechanically performing field weakening in an electric machine. The described techniques use a variable rotor skew angle to perform field weakening. At low speed, the described techniques can provide a control system that adjusts the skew angle to a low value or no skew. At low/medium torque and high speed, the described techniques can provide a control system that adjusts the skew angle higher based on motor speed and torque to perform field weakening. The described apparatus, systems, techniques and articles provide a rotor assembly that includes a rotor that is longitudinally divided into multiple parts and that can rotate within a stator with a skew angle.

Figure 1:
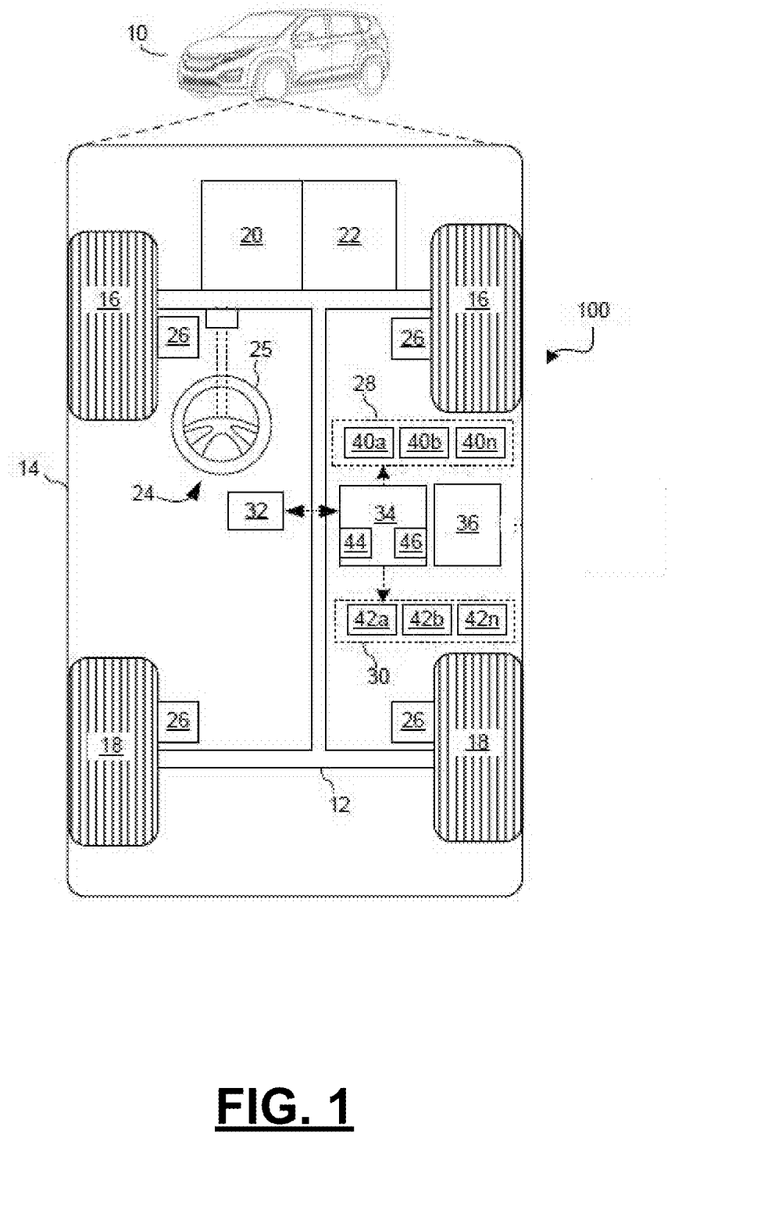
FIG. 1 is a block diagram depicting an example vehicle that may include an electric machine system with a rotor assembly that includes a plurality of rotor parts including a reference rotor part and a first control rotor part, in accordance with an embodiment.

FIG. 1 is a block diagram depicting an example vehicle that may include an electric machine system 100 with a rotor assembly that includes a plurality of rotor parts including a reference rotor part and a first control rotor part. In general, the electric machine system (or simply "system") 100 includes a first control rotor part that is controllable to rotate while aligned with the reference rotor part with a zero or near zero skew angle relative to the reference rotor part and is also controllable to rotate while unaligned with the reference rotor part with a non-zero skew angle relative to the reference rotor part. This allows the system 100 to perform field weakening operations when it is advantageous to do so.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In various embodiments, controller 34 is configured to implement a lane change speed management system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2A:
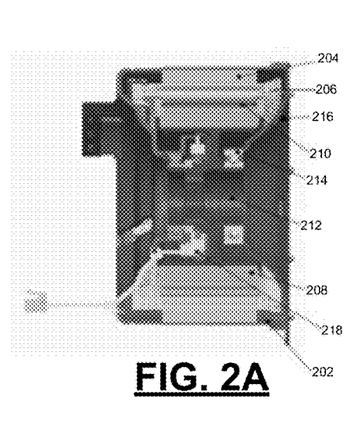
FIGS. 2A and 2B are diagrams depicting cross-sectional views of an example electric machine from two different perspectives, in accordance with an embodiment.
Figure 2B:
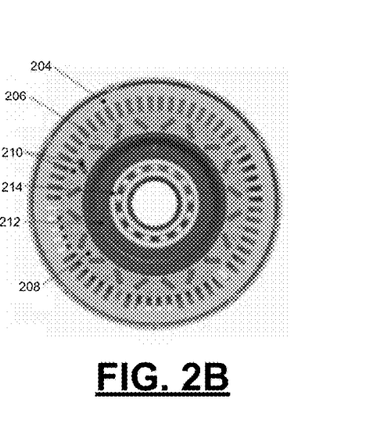

FIGS. 2A and 2B are diagrams depicting cross-sectional views of an example electric machine 200 from two different perspectives. The example electric machine 200 includes a housing 202 surrounding the example electric machine 200 and a stator stack 204 within the housing 202. The example stator stack 204 includes a plurality of windings 206 around an inner periphery of the stator stack 204. Enclosed within the example stator stack 204 is a rotor stack 208. The example rotor stack 208 includes a plurality of magnets 210 and a rotor hub 212. The example rotor stack 208 is configured to rotate within the stator stack 204 using a set of bearings 214. The example stator stack 204 and example rotor stack 208 are enclosed within the housing 202 by an end cover 216. The example electric machine 200 further includes a resolver 218 for measuring the degrees of rotation of the rotor stack 208.

Field weakening can be used to reduce the back-EMF, which may be advantageous in certain operating modes for efficiency and safety reasons. Disclosed herein are techniques for accomplishing field weakening in a manner that may be more efficient than in other field weakening techniques.

Figure 3A:
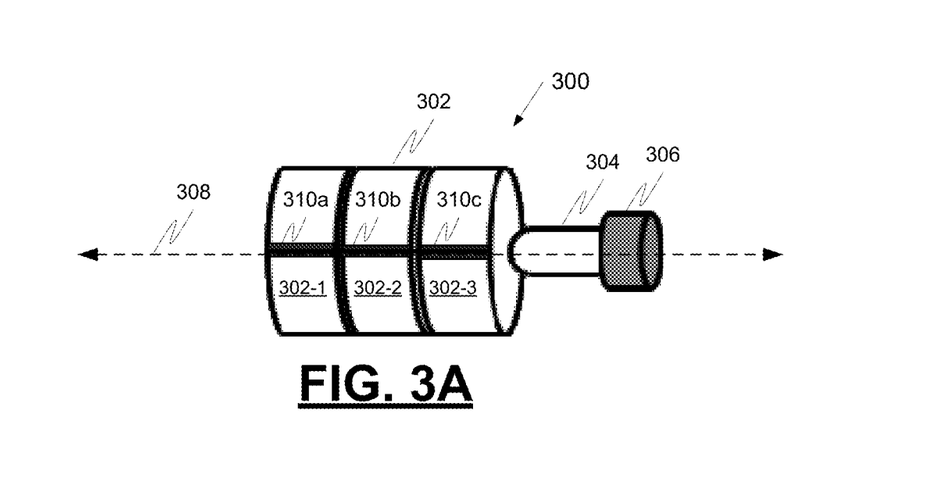
FIGS. 3A and 3B are schematic diagrams depicting selected sections of an example electric machine that includes a rotor assembly that has been mechanically separated into multiple rotor parts, in accordance with an embodiment.
Figure 3B:
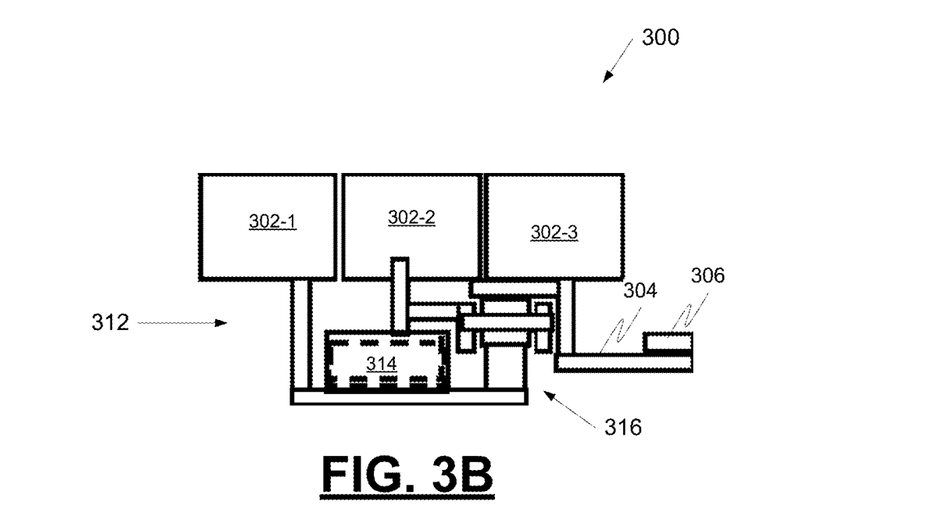

FIGS. 3A and 3B are schematic diagrams depicting selected sections of an example electric machine 300 that includes a rotor assembly 302 that has been mechanically separated into multiple rotor parts 302-1, 302-2, 302-3. The example rotor assembly 302 can be controlled to accomplish field weakening. The position of the multiple rotor parts 302-1, 302-2, 302-3 relative to each other while the example rotor assembly 302 rotates can be controlled to provide a rotor skew angle between rotor parts. The rotor skew angle can cause field weakening which can lead to reduced back EMF. A rotor skew angle can be determined by the angle defined by a radial line segment from a rotor magnet in a reference rotor part to a longitudinal axis and a radial line segment from a corresponding rotor magnet in another rotor part to the longitudinal axis. A rotor control system (not shown) can adjust the skew angle for one or more rotor parts as a function of rotor rotational speed and torque to maximize system efficiency over wide operating ranges.

Depicted in FIG. 3A is an example rotor assembly 302 that is attached to a shaft 304 and a pinion gear 306. The example rotor assembly 302 is positioned inside of a stator core (not shown) and is rotatable relative to the stator core. The example rotor assembly 302 extends along a longitudinal axis 308 and comprises a plurality of rotor parts 302-1, 302-2, 302-3. Each example rotor part 302-1, 302-2, 302-3 is a separate and distinct part of the example rotor assembly 302 and is separated from another rotor part by a plane intersecting the longitudinal axis. Each example rotor part is separately rotatable about the longitudinal axis 308. Each example rotor part 302-1, 302-2, 302-3, respectively, includes a magnet 310*a*, 310*b*, 310*c*. In this example configuration, the example rotor parts 302-1, 302-2, 302-3 are aligned with a zero or near zero skew angle between rotor parts and field weakening is not performed. In other example configurations, the example rotor parts 302-1, 302-2, 302-3 may be unaligned with a skew angle of up to 15 degrees or more between rotor parts as the rotor parts rotate within a stator core in an unaligned configuration to perform field weakening.

Depicted in FIG. 3B is an example skew-angle actuator system 312 coupled to the example rotor parts 302-1, 302-2, 302-3 that that drive the example shaft 304 and example pinion gear 306. The example skew-angle actuator system 312 includes an actuator 314, such as a variable cam timing hydraulic actuator, and a gear set 316, such as a load balancing gear set. The example actuator system 312 can be controlled to adjust the skew angle for one or more rotor parts as a function of rotor rotational speed and torque to maximize system efficiency over wide operating ranges. The example actuator system 312 can advance and/or retard one or more rotor parts 302-1, 302-2, 302-3 of the rotor assembly 302 relative to a reference rotor part.

In this example, the example actuator 314 is coupled to a first control side rotor part 302-1 and a second control side rotor part 302-2 via the example gear set 316. In this example, the first control side rotor part 302-1 and the second control side rotor part 302-2 are connected in parallel to the example actuator 314. This parallel connection can reduce the amount of machine torque the example actuator 314 must carry to maintain a skew angle between the first rotor part 302-1 and the third rotor part 302-3 (e.g., the reference rotor part in this example) and the skew angle between the second rotor part 302-2 and the third rotor part 302-3. This approach may reduce the actuator size, pressure, and power consumption.

FIGS. 4A-4D are schematic diagrams depicting example skew configurations for a rotor assembly having multiple rotor parts that can be skewed to cause field weakening. Each of the example rotor assemblies include a reference side and a control side. The reference side is the location on the machine that defines the reference magnet location for the skew angle determination. In some cases, the reference side is the side that is closest to the motor output. The control side is the location on the machine that defines the skew angle of control side magnets relative to reference side magnets. The control side can be advanced and/or retarded relative to the reference side.

Figure 4A:
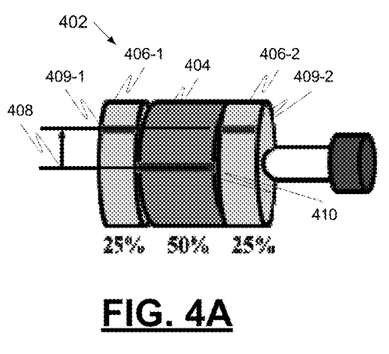
FIGS. 4A-4D are schematic diagrams depicting example skew configurations for a rotor assembly having multiple rotor parts that can be skewed to cause field weakening, in accordance with an embodiment.

Depicted in FIG. 4A is an example of a Herringbone skewing pattern in an example rotor assembly 402. The reference side 404 of the example rotor assembly 402 makes up 50% of the rotor and the control side comprises two rotor parts 406-1, 406-2 that each make up 25% of the rotor. Each of rotor parts 406-1, 406-2 on the control side, in this example, is advanced (as indicated by the arrow 408 that illustrates the advancement of the rotor magnets 409-1, 409-2 relative to the rotor magnet 410) relative to the reference side rotor part 404 to cause field weakening. The reference side rotor part 404, in this example, is situated between the two control side rotor parts 406-1, 406-2.

Figure 4B:
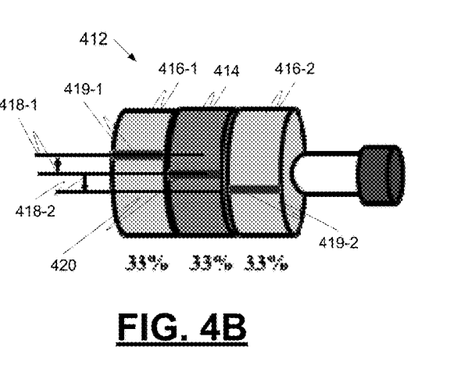

Depicted in FIG. 4B is an example of a Helix skewing pattern in an example rotor assembly 412. The reference side 414 of the example rotor assembly 412 makes up 33% of the rotor and the control side comprises two rotor parts 416-1, 416-2 that each make up 33% of the rotor. One rotor part 416-1 on the control side, in this example, is advanced relative to the reference rotor part 414 (as indicated by the up arrow 418-1 that illustrates the advancement of the rotor magnet 419-1 relative to the rotor magnet 420) and the other rotor part 416-2 on the control side is retarded relative to the reference rotor part 414 (as indicated by the down arrow 418-2 that illustrates the retarding of the rotor magnet 419-2 relative to the rotor magnet 420). The reference side rotor part 414, in this example, is situated between the two control side rotor parts 416-1, 416-2.

Figure 4C:
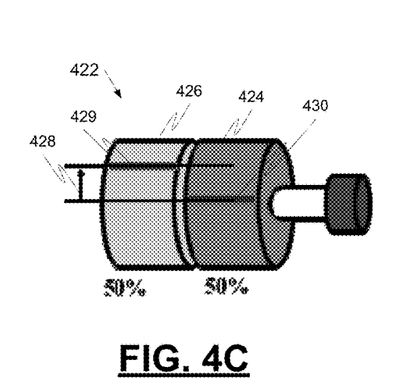

Depicted in FIG. 4C is an example of a two-piece skewing pattern in an example rotor assembly 422. The reference side 424 of the example rotor assembly 422 makes up 50% of the rotor and the control side comprises one rotor part 426 that makes up 50% of the rotor. The rotor part 426 on the control side, in this example, is advanced relative to the reference rotor part 424 (as indicated by the up arrow 428) to cause field weakening. The reference side rotor part 424, in this example, is situated closest to the output.

Figure 4D:
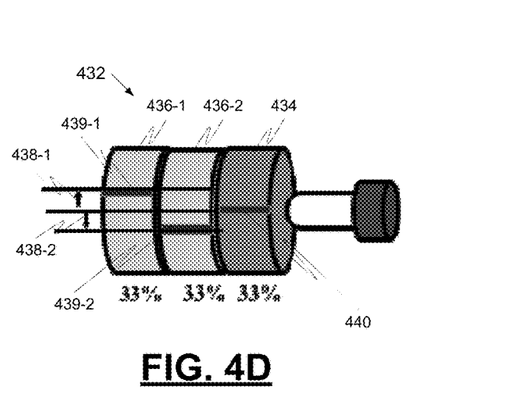

Depicted in FIG. 4D is an example of a zig-zag skewing pattern in an example rotor assembly 432. The reference side 434 of the example rotor assembly 432 makes up 33% of the rotor and the control side comprises two rotor parts 436-1, 436-2 that each make up 33% of the rotor. One rotor part 436-1 on the control side, in this example, is advanced relative to the reference side rotor part 434 (as indicated by the up arrow 438-1 that illustrates the advancement of the rotor magnet 439-1 relative to the rotor magnet 440) and the other rotor part 436-2 on the control side is retarded relative to the reference rotor part 434 (as indicated by the down arrow 438-2 that illustrates the retarding of the rotor magnet 439-2 relative to the rotor magnet 440). In this example, one rotor part 436-2 on the control side is situated between the other rotor part 436-1 on the control side section and the reference side rotor part 434. The reference side rotor part 434, in this example, is situated closest to the output.

In other examples, other numbers of reference side rotor parts and/or control side rotor parts are possible. Also in other examples, other skewing patterns are possible.

The variable skew techniques can have a significant impact on motor performance. The variable skew techniques can result in significantly reduced system power loss at high speed. The variable skew techniques can result in back EMF being reduced and in the reduction of motor fault issues due to short circuit and open circuit failures. In some examples, implementing the variable skew techniques with a high skew angle may make it possible to entirely eliminate EM spin loss for zero torque operation.

Figure 5A:
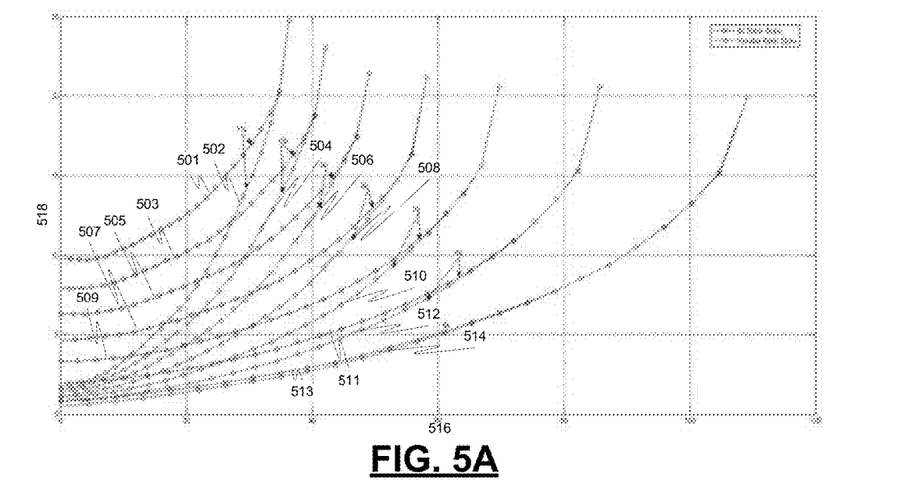
FIG. 5A is a diagram illustrating that system loss in kilowatts (kW) in an electric machine can be reduced with the use of skewing at different rotor rotational speeds versus no-skewing, in accordance with an embodiment.

FIG. 5A is a graph illustrating that system loss in kilowatts (kW) in an electric machine can be reduced with the use of skewing at different rotor rotational speeds versus no-skewing. Shown are a plurality of graphs of motor torque 516 versus system loss 518 both with and without rotor skewing at various rotor rotational speeds for an example 12-pole machine. Graph 501 depicts a plot of motor torque versus system loss without rotor skewing at a 11K RPM motor speed and graph 502 depicts a plot of motor torque versus system loss with rotor skewing at a 11K RPM motor speed. Graph 503 depicts a plot of motor torque versus system loss without rotor skewing at a 10K RPM motor speed and graph 504 depicts a plot of motor torque versus system loss with rotor skewing at a 10K RPM motor speed. Graph 505 depicts a plot of motor torque versus system loss without rotor skewing at a 9K RPM motor speed and graph 506 depicts a plot of motor torque versus system loss with rotor skewing at a 9K RPM motor speed. Graph 507 depicts a plot of motor torque versus system loss without rotor skewing at an 8K RPM motor speed and graph 508 depicts a plot of motor torque versus system loss with rotor skewing at a 8K RPM motor speed. Graph 509 depicts a plot of motor torque versus system loss without rotor skewing at a 7K RPM motor speed and graph 510 depicts a plot of motor torque versus system loss with rotor skewing at a 7K RPM motor speed. Graph 511 depicts a plot of motor torque versus system loss without rotor skewing at a 6K RPM motor speed and graph 512 depicts a plot of motor torque versus system loss with rotor skewing at a 6K RPM motor speed. Graph 513 depicts a plot of motor torque versus system loss without rotor skewing at a 5K RPM motor speed and graph 514 depicts a plot of motor torque versus system loss with rotor skewing at a 5K RPM motor speed. These graphs illustrate system loss improvement with variable skew.

Figure 5B:
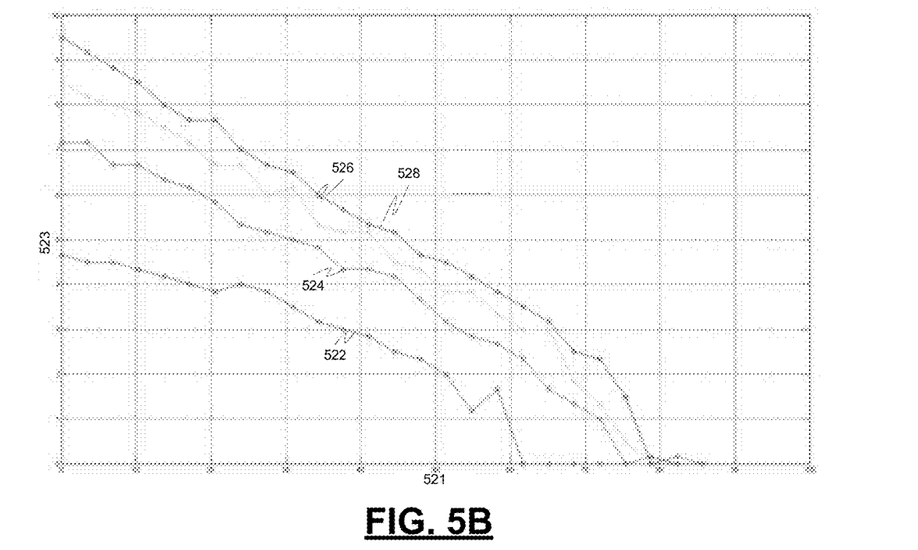
FIG. 5B is a diagram illustrating the optimal skew angle as function of torque and speed for an example 12 pole machine, in accordance with an embodiment.

FIG. 5B is a graph illustrating the optimal skew angle as function of torque and speed for an example 12 pole machine. Shown are a plurality of graphs of motor torque 521 versus skew angle 523. Graph 522 is a plot of motor torque versus skew angle at a 5K RPM motor speed. Graph 524 is a plot of motor torque versus skew angle at a 6K RPM motor speed. Graph 526 is a plot of motor torque versus skew angle at a 7K RPM motor speed. Graph 528 is a plot of motor torque versus skew angle at an 8K RPM motor speed. These example plots show for this configuration that as the torque increases, the optimal skew angle decreases. Also, these example plots show for this configuration that as the speed increases the optimal skew angle increases.

Figure 5C:
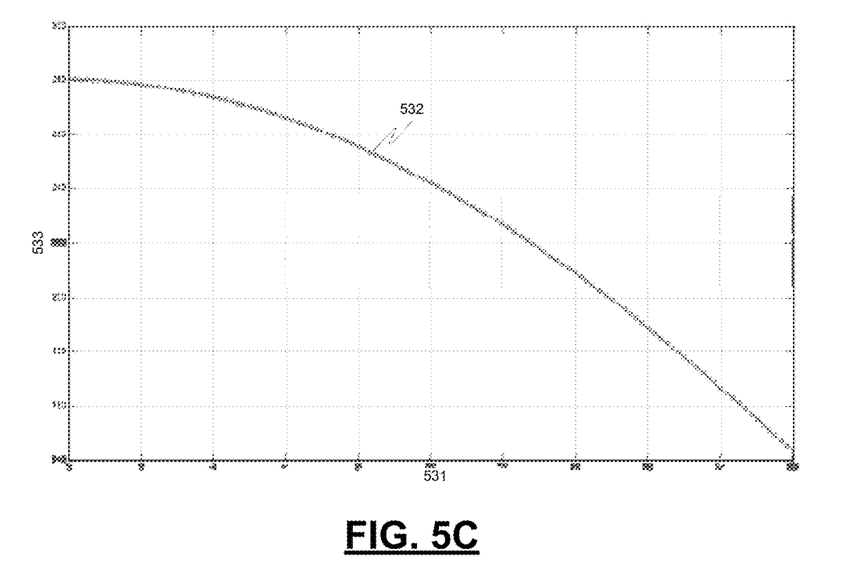
FIG. 5C is a graph illustrating the relationship for an example 12 pole machine between the skew angle and the phase back EMF, in accordance with an embodiment.

FIG. 5C is a graph illustrating the relationship for an example 12 pole machine between the skew angle 531 and the phase back EMF 533. Shown is a plot 532 that illustrates, for this example, that as the skew angle is increased, the back EMF decreases.

Figure 6A:
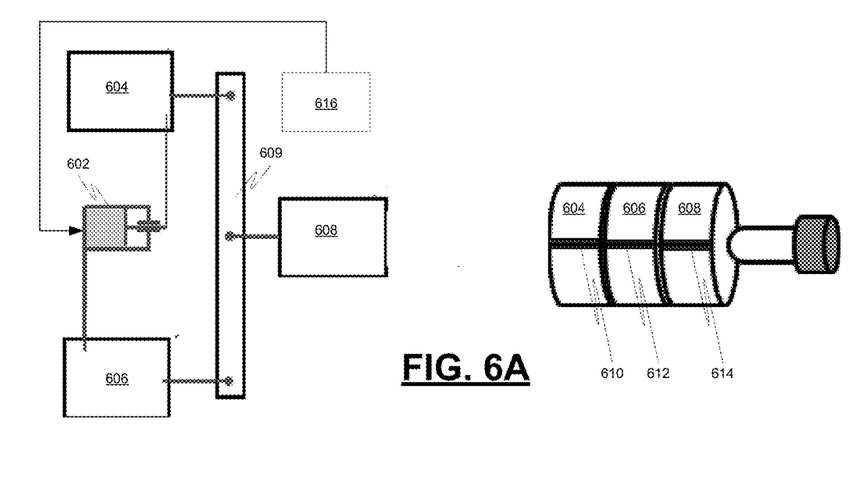
FIGS. 6A and 6B are lever diagrams illustrating the use of a load balancing gear set with a variable cam timing hydraulic (or electric) actuator to advance and/or retard the control side rotor parts of a rotor assembly, in accordance with an embodiment.
Figure 6B:
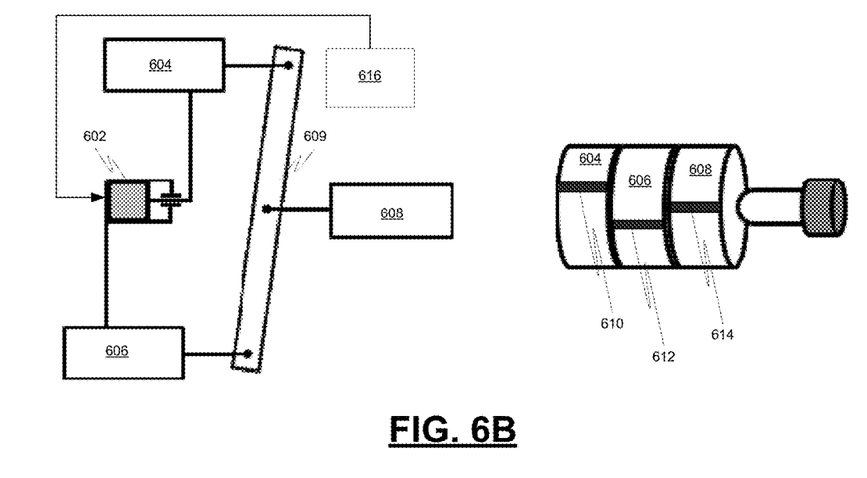

FIGS. 6A and 6B are lever diagrams illustrating the use of a load balancing gear set (not shown) with a variable cam timing hydraulic (or electric) actuator 602 to advance and/or retard the control side rotor parts of a rotor assembly. In these examples, the example actuator 602 is coupled to a first control side rotor part 604 and a second control side rotor part 606 via a load balancing gear set (not shown). In the example configuration, the example actuator 602 has a parallel connection to each of the first control side rotor part 604 and the second control side rotor part 606 that reduces the need for the actuator to carry a high percentage of the machine torque. This approach greatly reduces actuator size, pressure, and power consumption.

A controller 616 is provided that controls the example actuator 602 to operate the rotor assembly with or without rotor skew. Depending on the commanded torque and motor rotational speed, the controller 616 can command the actuator 602 to operate one or more of the rotor parts 604, 606 with a skew angle relative to the reference rotor part 608 or without a skew angle relative to the reference rotor part 608. For example, at low commanded torque while operating at high motor speeds, the controller 616 can command the actuator to perform field weakening by operating one or more of the rotor parts 604, 606 at a skew angle relative to a reference rotor part 608.

The example controller 616 includes at least one processor and a computer-readable storage device or media. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller 616, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 616.

The processors and memory of the example controller 616 are configured by the executable programming instructions to control the example actuator 602 to operate one or more of the rotor parts 604, 606 with a skew angle relative to the reference rotor part 608 or without a skew angle relative to the reference rotor part 608. The example controller 616 is further configured by the executable programming instructions to control the degree of skew angles between the control rotor parts 604, 606 and the reference rotor part 608.

In the example of FIG. 6A, the actuator 602 does not advance or retard either of the first control side rotor part 604 or the second control side rotor part 606. In this example, the rotor assembly rotates with each of the first control side rotor part 604 and the second control side rotor part 606 aligned with the reference side rotor part 608 as illustrated by the first control side rotor magnet 610 and the second control side rotor magnet 612 aligned with the reference side rotor magnet 614.

In the example of FIG. 6B, the example controller 610 controls the example actuator 602 (and gear set) to operate in an operating mode in which the actuator advances the first control side rotor part 604 (as illustrated by the lever 609 having a top portion advanced) and retards the second control side rotor part 606 (as illustrated by the lever 609 having a bottom portion retarded) relative to the reference rotor part 608. As illustrated, the first control side rotor magnet 610 is not aligned with and is advanced relative to the reference side rotor magnet 614. Also, as illustrated the second control side rotor magnet 612 is not aligned with and is retarded relative to the reference side rotor magnet 614. The load balancing gear set allows for the angular advancement of the first control side rotor part to be equal to the angular retarding of the second control side rotor part. Because the size of the first control side rotor part and the second control side rotor part are the same and the angular advancement of the first control side rotor part is equal to the angular retarding of the second control side rotor part, the torque required to hold the advancement of the first control side rotor part is cancelled by the torque required to hold the retarding of the second control side rotor part. The actuator does not need to carry a high percentage of the machine torque, which allows for reduced actuator size, pressure, and power consumption.

Figure 7:
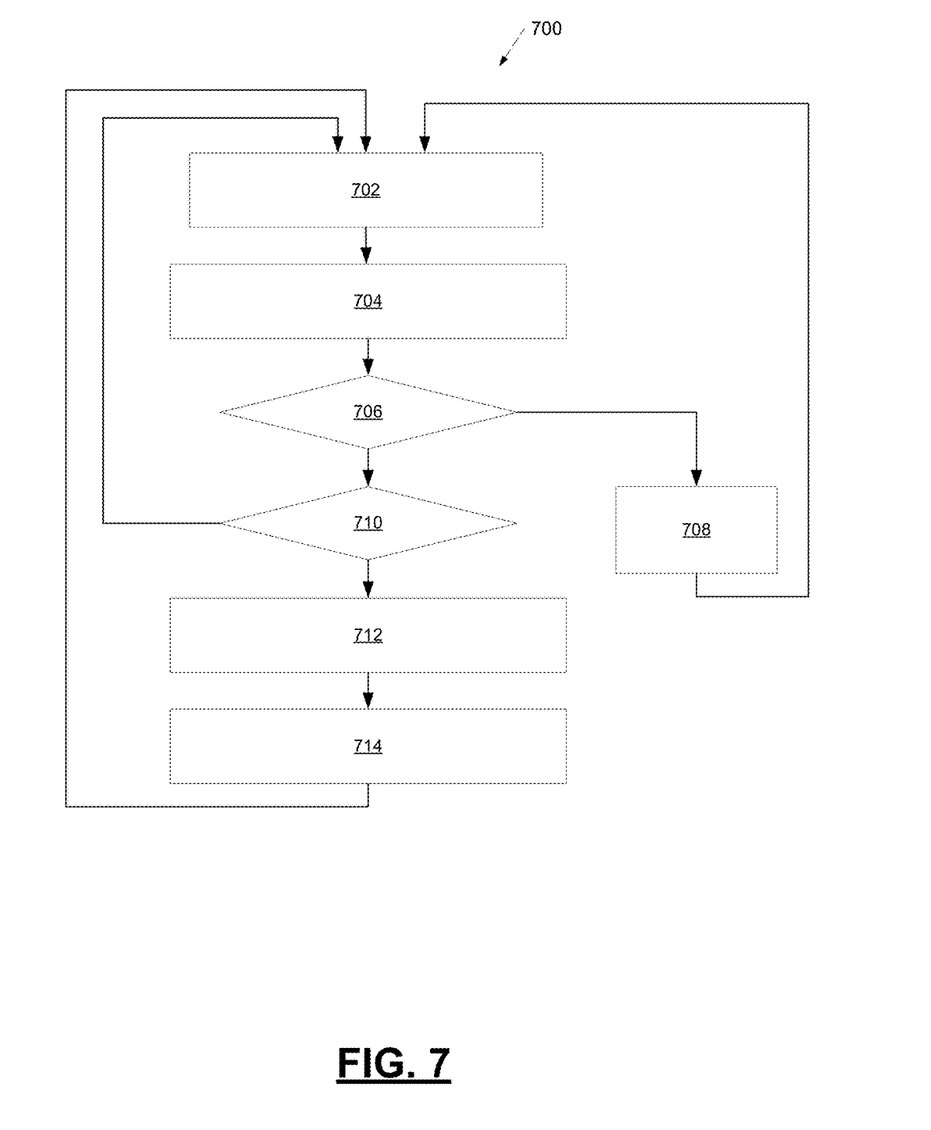
FIG. 7 is a process flow chart depicting an example process in an example electric machine that includes a rotor assembly positioned inside of a stator core and rotatable relative to the stator core wherein the rotor assembly extends along a longitudinal axis and includes a plurality of rotor parts including a reference rotor part and one or more control rotor parts, in accordance with an embodiment.

FIG. 7 is a process flow chart depicting an example process 700 in an example electric machine. The order of operation within the example process 700 is not limited to the sequential execution as illustrated in the figure, but may be performed in one or more varying orders as applicable and in accordance with the present disclosure.

The example electric machine includes a rotor assembly that is positioned inside of a stator core and that is rotatable relative to the stator core wherein the rotor assembly extends along a longitudinal axis and includes a plurality of rotor parts including a reference rotor part and one or more control rotor parts. Each rotor part is rotatable about the longitudinal axis and is mechanically separated from another rotor part along the longitudinal axis.

The example process 700 includes monitoring selected parameters (operation 702). Examples of selected parameters that may be monitored include the commanded machine torque and the motor rotational speed.

Based on the monitored parameters, an operational mode is determined (operation 704). The operational modes may include a first operational mode and a second operational mode. The first operational mode may occur when the electric machine is operated at high torque and low speed. The second operational mode may occur when the electric machine is operated at low torque and high speed.

If it is determined the electrical machine is operating in a first operating mode (yes at decision 706), the rotor assembly is controlled to operate with zero or near zero skew angle (operation 708). The electric machine then continues to monitor parameters (operation 702).

If it is determined the electrical machine is not operating in a first operating mode (no at decision 706), it is determined if the electrical machine is operating in a second operating mode (decision 710). If it is determined that the electrical machine is operating in a second operating mode (yes, at decision 710), a desired skew angle is determined for which to operate the rotor assembly (operation 712). The rotor assembly is controlled to operate with the desired skew angle (operation 714). In the case of multiple control rotor parts, the control parts may be controlled to rotate with the same skew angle, different skew angles, and/or skew angles of the same magnitude but different polarity. The electric machine then continues to monitor parameters (operation 702). If it is determined that the electrical machine is not operating in a second operating mode (no, at decision 710), the electric machine continues to monitor parameters (operation 702).

Described herein are techniques for mechanically performing magnetic field weakening. The apparatus, systems, techniques and articles provide a rotor assembly that includes a rotor that is longitudinally divided into multiple parts and that can rotate within a stator with a skew angle, which in turn can advantageously provide magnetic field weakening.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electric machine assembly comprising:
a rotor assembly positioned inside of a stator core and rotatable relative to the stator core, the rotor assembly extending along a longitudinal axis and comprising a plurality of rotor parts including a reference rotor part and a first control rotor part, each rotor part rotatable about the longitudinal axis and mechanically separated from another rotor part along the longitudinal axis, the first control rotor part controllable to rotate while aligned with the reference rotor part with a zero or near zero skew angle relative to the reference rotor part, the first control rotor part controllable to rotate while unaligned with the reference rotor part with a non-zero skew angle relative to the reference rotor part; and
a rotor controller configured to control the first control rotor part to rotate while aligned with the reference rotor part with a zero or near zero skew angle relative to the reference rotor part and configured to control the first control rotor part to rotate while unaligned with the reference rotor part with a non-zero skew angle relative to the reference rotor part, the controller comprising a processor configured by programming instructions encoded on non-transitory computer readable media to control the degree of skew angle between the control rotor part and the reference rotor part.

2. The assembly of claim 1, wherein the rotor assembly further comprises a second control rotor part.

3. The assembly of claim 2, wherein the second control rotor part is controllable to rotate while aligned with the reference rotor part with a zero or near zero skew angle relative to the reference rotor part and controllable to rotate while unaligned with the reference rotor part with a non-zero skew angle relative to the reference rotor part.

4. The assembly of claim 2, wherein the rotor controller is configured to control the first control rotor part to rotate while unaligned with the reference rotor part with a first non-zero skew angle relative to the reference rotor part and configured to control the second control rotor part to rotate while unaligned with the reference rotor part with a second non-zero skew angle relative to the reference rotor part that is different from the first non-zero skew angle.

5. The assembly of claim 2, wherein the reference rotor part is positioned between the first control rotor part and the second control rotor part.

6. The assembly of claim 2, wherein the second control rotor part is positioned between the first control rotor part and the reference rotor part.

7. The assembly of claim 2, further comprising a variable cam timing actuator configured to drive the first control rotor part to rotate while unaligned with the reference rotor part with a first non-zero skew angle relative to the reference rotor part and configured to drive the third rotor part to rotate while unaligned with the reference rotor part with a second non-zero skew angle relative to the reference rotor part that is different from the first non-zero skew angle.

8. The assembly of claim 7, further comprising a load balancing gear set configured to drive the first control rotor part to rotate while unaligned with the reference rotor part with a first non-zero skew angle relative to the reference rotor part and configured to drive the third rotor part to rotate while unaligned with the reference rotor part with a second non-zero skew angle relative to the reference rotor part that is of the same magnitude but opposite in polarity as the first non-zero skew angle.

9. A method in an electric machine comprising a rotor assembly positioned inside of a stator core and rotatable relative to the stator core, the rotor assembly extending along a longitudinal axis and comprising a plurality of rotor parts including a reference rotor part and a first control rotor part, each rotor part rotatable about the longitudinal axis and mechanically separated from another rotor part along the longitudinal axis, the method comprising:
rotating the first control rotor part and the reference rotor part, in a first mode of operation, with the first control rotor part aligned with the reference rotor part with a zero or near zero skew angle between the first control rotor part and the reference rotor part; and
rotating the first control rotor part and the reference rotor part, in a second mode of operation, with the first control rotor part unaligned with the reference rotor part with a non-zero skew angle between the first control rotor part and the reference rotor part.

10. The method of claim 9, wherein the first mode of operation occurs when the electric machine is operated at high torque and low speed.

11. The method of claim 9, wherein the second mode of operation occurs when the electric machine is operated at low torque and high speed.

12. The method of claim 9, wherein the rotor assembly further comprises a second control rotor part.

13. The method of claim 12, further comprising:
rotating the second control rotor part, in the first mode of operation, with the second control rotor part aligned with the reference rotor part with a zero or near zero skew angle between the first control rotor part and the reference rotor part; and
rotating the second control rotor part, in the second mode of operation, with the second control rotor part unaligned with the reference rotor part with a non-zero skew angle between the second control rotor part and the reference rotor part.

14. The method of claim 13, wherein rotating the second control rotor part comprises:
rotating the second control rotor part, in the second mode of operation, with the second control rotor part unaligned with the reference rotor part with a non-zero skew angle between the second control rotor part and the reference rotor part that is different from the skew angle between the first control rotor part and the reference rotor part.

15. The method of claim 14, wherein the non-zero skew angle between the second control rotor part and the reference rotor part is of the same magnitude but opposite in polarity to the skew angle between the first control rotor part and the reference rotor part.

16. The method of claim 12, wherein the second control rotor part is positioned between the first control rotor part and the reference rotor part.

17. A vehicle, comprising an electric permanent magnet motor and a controller, the permanent magnet motor comprising a rotor assembly positioned inside of a stator core and rotatable relative to the stator core, the rotor assembly extending along a longitudinal axis and comprising a plurality of rotor parts including a reference rotor part and a first control rotor part, each rotor part rotatable about the longitudinal axis and mechanically separated from another rotor part along the longitudinal axis, the controller comprising one or more processors and non-transient computer readable media encoded with programming instructions, the controller configured to:
control the first control rotor part to rotate while aligned with the reference rotor part with a zero or near zero skew angle relative to the reference rotor part; and
control the first control rotor part to rotate while unaligned with the reference rotor part with a non-zero skew angle relative to the reference rotor part.

18. The vehicle of claim 17, wherein the rotor assembly further comprises a second control rotor part.

19. The vehicle of claim 18, further comprising a variable cam timing actuator configured to drive the first control rotor part to rotate while unaligned with the reference rotor part with a first non-zero skew angle relative to the reference rotor part and configured to drive the third rotor part to rotate while unaligned with the reference rotor part with a second non-zero skew angle relative to the reference rotor part that is different from the first non-zero skew angle.

20. The vehicle of claim 19, further comprising a load balancing gear set configured to drive the first control rotor part to rotate while unaligned with the reference rotor part with a first non-zero skew angle relative to the reference rotor part and configured to drive the third rotor part to rotate while unaligned with the reference rotor part with a second non-zero skew angle relative to the reference rotor part that is of the same magnitude but opposite in polarity as the first non-zero skew angle.

* * * * *